US 8,966,061 B2

(12) United States Patent
Kim et al.

(10) Patent No.: US 8,966,061 B2
(45) Date of Patent: Feb. 24, 2015

(54) APPARATUS AND METHOD FOR LAWFUL INTERCEPTION

(75) Inventors: Junghak Kim, Daejeon (KR); Song In Choi, Daejeon (KR); Jee Hwan Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 250 days.

(21) Appl. No.: 13/247,007

(22) Filed: Sep. 28, 2011

(65) Prior Publication Data

US 2012/0158955 A1 Jun. 21, 2012

(30) Foreign Application Priority Data

Dec. 21, 2010 (KR) ........................ 10-2010-0131855

(51) Int. Cl.
*G06F 15/173* (2006.01)
*H04L 29/06* (2006.01)

(52) U.S. Cl.
CPC ..................................... *H04L 63/30* (2013.01)
USPC .......................................................... 709/224

(58) Field of Classification Search
USPC .......................................................... 709/224
See application file for complete search history.

(56) References Cited

U.S. PATENT DOCUMENTS

| 7,382,881 B2 * | 6/2008 | Uusitalo et al. ............... 380/262 |
| 7,447,909 B2 * | 11/2008 | Reith ............................. 713/183 |
| 7,577,422 B2 * | 8/2009 | Laiho et al. .................... 455/410 |
| 7,975,046 B2 * | 7/2011 | Sheppard ........................ 709/224 |
| 8,041,022 B1 * | 10/2011 | Andreasen et al. ......... 379/221.1 |
| 8,127,005 B2 * | 2/2012 | Fernandez Gutierrez .... 709/224 |
| 8,340,292 B1 * | 12/2012 | Schnellbacher et al. ...... 380/250 |
| 8,488,465 B2 * | 7/2013 | Solis et al. ..................... 370/235 |
| 8,542,592 B2 * | 9/2013 | Moisand et al. ............... 370/235 |
| 8,565,382 B2 * | 10/2013 | Tian et al. ........................ 379/35 |
| 8,599,747 B1 * | 12/2013 | Saleem et al. ................. 370/321 |
| 2005/0076117 A1 * | 4/2005 | Hou et al. ....................... 709/224 |
| 2006/0034198 A1 | 2/2006 | Makinen et al. |
| 2010/0115018 A1 * | 5/2010 | Yoon et al. ..................... 709/201 |
| 2010/0199189 A1 * | 8/2010 | Ben-Aroya et al. ........... 715/736 |
| 2010/0278534 A1 * | 11/2010 | Leiden et al. .................... 398/67 |
| 2012/0079023 A1 * | 3/2012 | Tejada-Gamero et al. ... 709/204 |
| 2012/0158955 A1 * | 6/2012 | Kim et al. ...................... 709/224 |

OTHER PUBLICATIONS

Myoungrak Lee, et al. "A Seamless Lawful Interception Architecture for Mobile Users in IEEE 802.16e Networks", Dec. 2009, Journal of Communications and Networks. vol. 11, No. 6, pp. 626-633.*

* cited by examiner

*Primary Examiner* — Farid Homayounmehr
*Assistant Examiner* — Sanchit Sarker
(74) *Attorney, Agent, or Firm* — Staas & Halsey LLP

(57) ABSTRACT

A lawful interception apparatus of a service providing system inquires of a trust server in which a law execution server commissions lawful interception authority whether a terminal that connects to a service connection point is an interception target, determines whether a terminal that connects to a service connection point is an interception target, and if a terminal that connects to a service connection point is an interception target, and the lawful interception apparatus intercepts communication traffic that is related to the terminal.

11 Claims, 5 Drawing Sheets

APPARATUS AND METHOD FOR LAWFUL INTERCEPTION

CROSS-REFERENCE TO RELATED APPLICATION

This application claims priority to and the benefit of Korean Patent Application No. 10-2010-0131855 filed in the Korean Intellectual Property Office on Dec. 21, 2010, the entire contents of which are incorporated herein by reference.

BACKGROUND OF THE INVENTION (a) Field of the Invention

The present invention relates to an apparatus and method for lawful interception. More particularly, the present invention relates to an apparatus and method for lawful interception that can continue to intercept a terminal even when the terminal moves and connects to another network.

(b) Description of the Related Art

Lawful interception is to intercept communication traffic generating from an interception target by a law enforcement authority that receives lawful authority or communication traffic that is transmitted to an interception target. The lawful interception requires a communication service provider's cooperation. Particularly, by passing a bill of Communications Assistance for Law Enforcement Act (CALEA), U.S. congress enacts and operates a bill that allows a communication service provider to cooperate to lawful interception.

Conventionally, an interception structure that is suggested by a standard of lawful interception of Europe or U.S. or a group following the standard is formed in a structure in which a communication service provider previously receives commission of interception authority of an interception target from an interception request institution, previously prepares an interception function of the interception target, performs interception, and provides interception information to the interception request institution. In the structure, when a moving interception target connects to a network of a communication service provider that does not receive commission of interception authority, a procedure for determining whether a terminal that newly connects to the network is an interception target is necessary, and only when the communication service provider acquires new interception authority, normal interception can be performed. That is, communication contents that are generated before such a procedure is complete may not be transmitted to an interception request institution. Therefore, in the interception structure, it is difficult to continue to intercept an interception target in a mobile network or a wireless network.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for lawful interception having advantages of being capable of continuing to intercept a terminal even when the terminal moves and connects to another network.

An exemplary embodiment of the present invention provides a lawful interception apparatus of a service providing system. The lawful interception apparatus includes an interception target determination unit and an interception unit.

The interception target determination unit inquires of a trust server in which a law enforcement server commissions lawful interception authority whether a terminal that connects to a service connection point of the service providing system is an interception target and determines whether the terminal is the interception target. The interception unit intercepts communication traffic that is related to the terminal, if the terminal is the interception target.

Another embodiment of the present invention provides a method of performing lawful interception of a terminal in a first service providing system of a first network. The method includes receiving, when the terminal connects to a service connection point of the first service providing system, information to use for an interception inquiry from the terminal and information of a trust server in which a law enforcement server commissions lawful interception authority; inquiring of the trust server whether the terminal is an interception target and determining whether the terminal is the interception target; and intercepting, if the terminal is the interception target, communication traffic that is related to the terminal.

Yet another embodiment of the present invention provides a method of performing lawful interception of a terminal in a service providing system that receives a request for lawful interception from a law enforcement server. The method includes transmitting, when the terminal connects to a service connection point of the service providing system, information of the service providing system, information of the terminal, and information of a trust server in which the law enforcement server commissions lawful interception authority to the terminal; inquiring of the trust server whether the terminal is an interception target and determining whether the terminal is the interception target; and intercepting, if the terminal is the interception target, communication traffic that is related to the terminal.

DETAILED DESCRIPTION OF THE EMBODIMENTS

Figure 1:
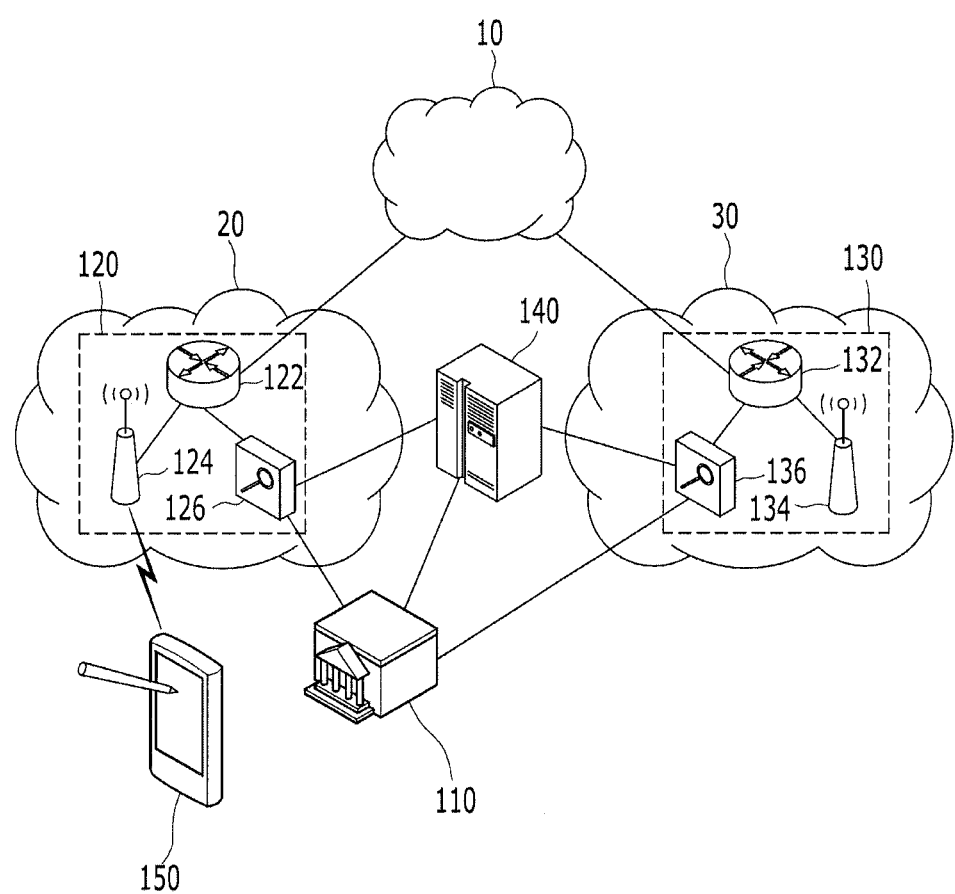
FIG. 1 is a diagram illustrating a network system for lawful interception according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising", will be understood to imply the inclusion of stated elements but not the exclusion of any other elements.

In this specification, a terminal may indicate a mobile station (MS), a mobile terminal (MT), a subscriber station (SS), a portable subscriber station (PSS), a user equipment (UE), and an access terminal (AT) and may include an entire function or a partial function of the MT, the SS, the PSS, the UE, and the AT.

Hereinafter, an apparatus and method for lawful interception according to an exemplary embodiment of the present invention will be described in detail with respect to the drawings.

FIG. 1 is a diagram illustrating a network system for lawful interception according to an exemplary embodiment of the present invention.

Referring to FIG. 1, a network system for lawful interception includes a law enforcement server 110, service providing systems 120 and 130 that provide a line for connecting to a public network 10, a trust server 140, and a terminal 150, which is an interception target.

In order to intercept communication traffic that is generated from the terminal 150, which is an interception target, or communication traffic that is transmitted to the terminal 150, the law enforcement server 110 is a server of law enforcement authority that receives a warrant from a court and that acquires legal authority.

The law enforcement server 110 requests to intercept communication traffic that is related to the terminal 150 to the service providing systems 120 and 130 and commissions lawful interception authority of the terminal 150 to the trust server 140.

The service providing systems 120 and 130 include a router and/or gateways 122 and 132 that provide a line for allowing the terminal 150 to connect to the public network 10 in networks 20 and 30, respectively. The router and the gateway are different network devices, but for convenience, FIG. 1 illustrates the router and the gateway as one network device.

The service providing systems 120 and 130 can provide different network services to the terminal 150 in the networks 20 and 30, respectively.

The service providing systems 120 and 130 may include wireless access devices 124 and 134, respectively, for wireless access of the terminal 150.

Further, the service providing systems 120 and 130 include lawful interception apparatuses 126 and 136, respectively that intercept communication traffic that is related to the terminal 150 according to a request of the law enforcement server 110.

The lawful interception apparatuses 126 and 136 analyze communication traffic that is related to the terminal 150 according to a request of the law enforcement server 110 and transmit communication related information and communication data (hereinafter, referred to as 'interception information') to the law enforcement server 110.

The lawful interception apparatuses 126 and 136 inquire of the trust server 140 whether the terminal 150 that is connected to the service providing systems 120 and 130, respectively, is an interception target, and if the terminal 150 is an interception target, the lawful interception apparatuses 126 and 136 intercept communication traffic that is related to the terminal 150.

The trust server 140 is a server of a reliable institution that receives commission of lawful interception authority from the law enforcement server 110, and when the trust server 140 receives commission of lawful interception authority from the law enforcement server 110, the trust server 140 receives information of a service providing system (for example, 120) that receives a request for lawful inception of the terminal 150 from the law enforcement server 110 and information of an interception target.

The trust server 140 receives an inquiry whether the terminal 150 is an interception target from the service providing systems 120 and 130 to which the terminal 150 connects and provides determination whether the terminal 150 is an interception target to the service providing systems 120 and 130.

The service providing systems 120 and 130 to which the terminal 150 connects transmit information to use for an interception inquiry to the trust server 140 and can inquire whether the terminal 150 is an interception target, and the trust server 140 determines whether the terminal 150 is an interception target using information that receives from the law enforcement server 110 and information to use for an interception inquiry.

The terminal 150 communicates with the wireless access devices 124 and 134 and can connect to the public network 10 through a router and/or gateways 122 and 132.

Further, the terminal 150 can continue to receive a network service even while moving through handover or roaming with the service providing systems 120 and 130.

Figure 2:
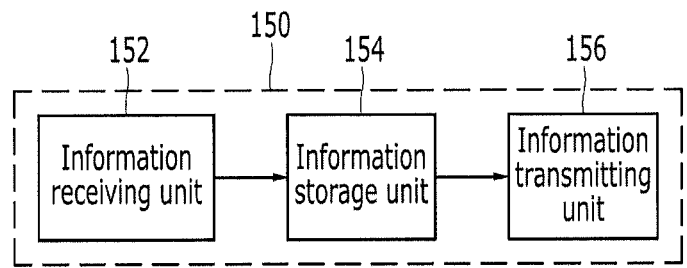
FIG. 2 is a block diagram illustrating a configuration of a terminal that is shown in FIG. 1.

FIG. 2 is a block diagram illustrating a configuration of a terminal that is shown in FIG. 1.

Referring to FIG. 2, the terminal 150 includes an information receiving unit 152, an information storage unit 154, and an information transmitting unit 156.

When the terminal 150 connects to a service providing system (for example, 120) that receives a request for lawful interception of the terminal 150 from the law enforcement server 110, the information receiving unit 152 receives information to use for an interception inquiry from the service providing system 120. In this case, the information to use for an interception inquiry may include information of a service connection point of the service providing system 120 to which the terminal 150 connects, information of the service providing system 120, information of a service, information of the terminal 150 and a user that is related to the terminal 150, and information of the trust server 140 that is related to lawful interception.

The information storage unit 154 stores the information to use for an interception inquiry that receives through the information receiving unit 152.

When the terminal 150 connects to a service connection point of another service providing system (for example, 130 of FIG. 1) by moving a network, the information transmitting unit 156 transmits the information to use for an interception inquiry that is stored in the information storage unit 154 to the service providing system 130.

Accordingly, the lawful interception apparatus 136 of the service providing system 130 transmits the information to use for an interception inquiry that receives through the information transmitting unit 156 to the trust server 140, receives determination whether the terminal 150 is an interception target from the trust server 140, and if the terminal 150 is an interception target, the lawful interception apparatus 136 intercepts communication traffic that is related to the terminal 150.

Thereby, even if the service providing system 130 does not previously receive commission of interception authority of the terminal 150 from the law enforcement server 110, the service providing system 130 can perform interception of the terminal 150.

Figure 3:
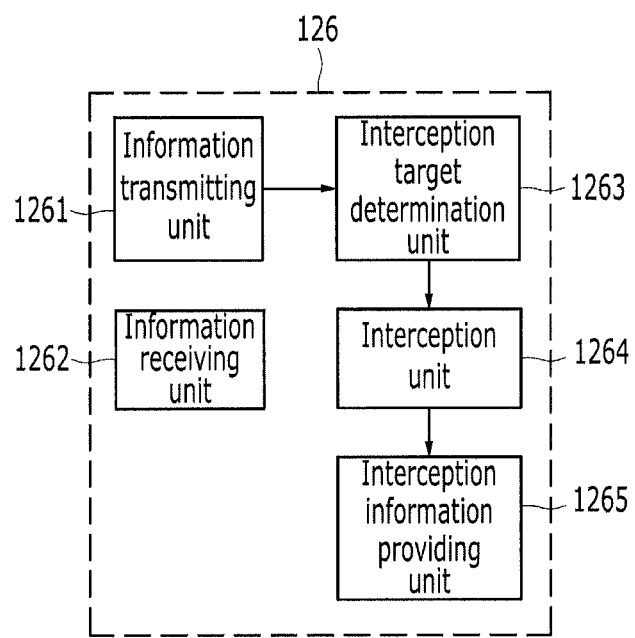
FIG. 3 is a block diagram illustrating a configuration of a lawful interception apparatus that is shown in FIG. 1.

FIG. 3 is a block diagram illustrating a configuration of a lawful interception apparatus that is shown in FIG. 1.

FIG. 3 illustrates the lawful interception apparatus 126 of the service providing system 120, but the lawful interception apparatus 136 of the service providing system 130 may be also formed equal to or similar to the lawful interception apparatus 126.

Referring to FIG. 3, the lawful interception apparatus 126 includes an information transmitting unit 1261, an information receiving unit 1262, an interception target determination unit 1263, an interception unit 1264, and an interception information providing unit 1265.

When the terminal 150 connects to a service connection point of the service providing system 120 that receives a request for lawful interception of the terminal 150 from the law enforcement server 110, the information transmitting unit 1261 transmits information to use for an interception inquiry to the terminal 150. As described above, the information to use for an interception inquiry may include information of a service connection point of the service providing system 120 to which the terminal 150 connects, information of the service providing system 120, information of a service, information of the terminal 150 and a user that is related to the terminal 150, and information of the trust server 140 that is related to lawful interception.

The information receiving unit 1262 receives information to use for an interception inquiry from the terminal 150. The terminal 150 connects to the service providing system 120 that receives a request for lawful interception of the terminal 150 from the law enforcement server 110 and receives information to use for an interception inquiry. Further, the terminal 150 stores information to use for an interception inquiry, and when the terminal 150 connects to another network by moving, the terminal 150 transmits the stored information to use for an interception inquiry to a service providing system of the another network and receives information to use for an interception inquiry from a corresponding service providing system.

The interception target determination unit 1263 transmits information to use for an interception inquiry to the trust server 140, inquires whether the terminal 150 is an interception target, receives result information of the inquiry whether the terminal 150 is an interception target from the trust server 140, and determines whether the terminal 150 is an interception target.

If the terminal 150 is an interception target from the result information that receives from the trust server 140, the interception unit 1264 intercepts communication traffic that is related to the terminal 150.

The interception information providing unit 1265 provides interception information of communication traffic that is related to the terminal 150 to the law enforcement server 110.

Figure 4:
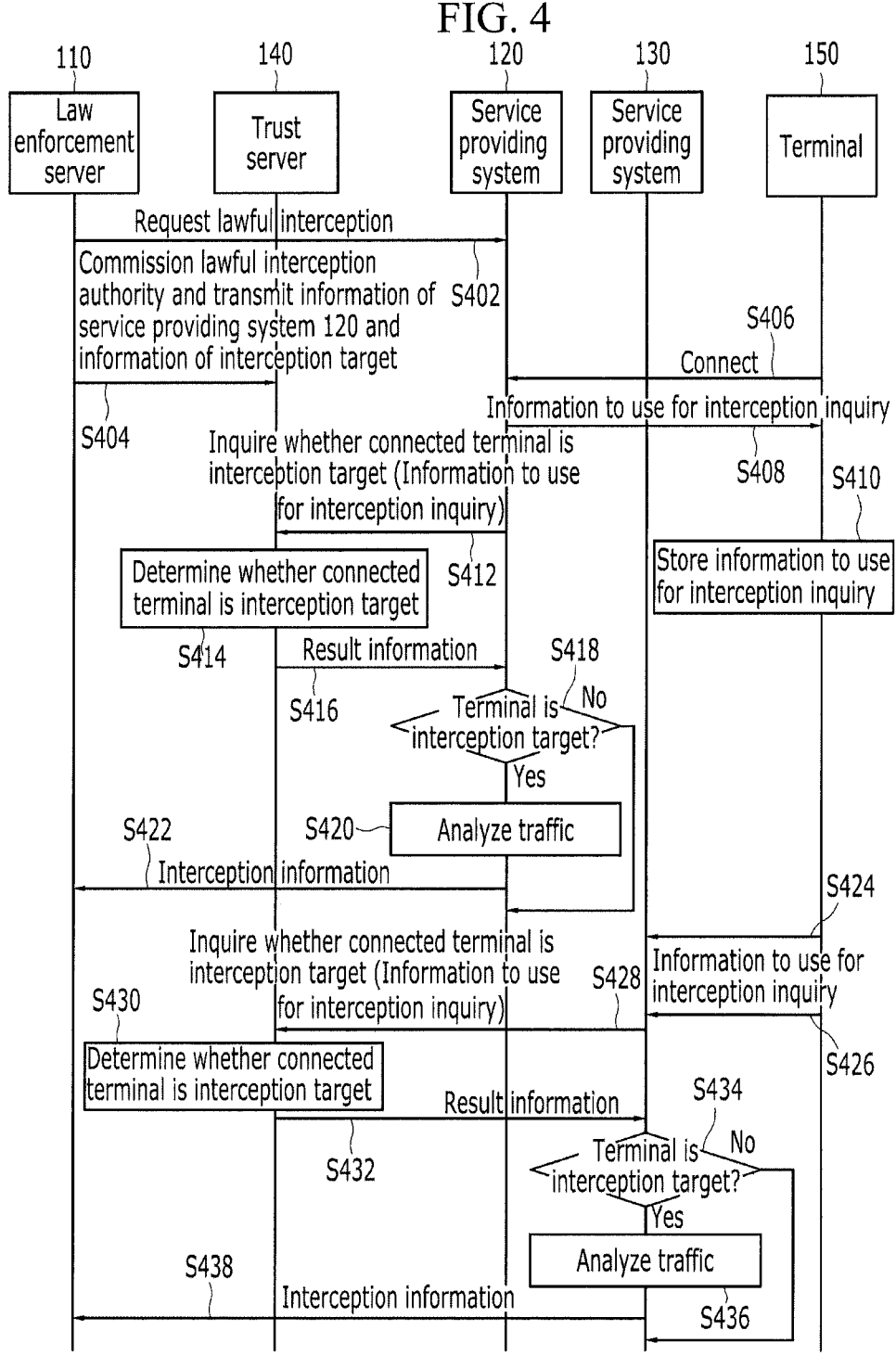
FIGS. 4 and 5 are flowcharts illustrating a method of performing lawful interception according to a first exemplary embodiment and a second exemplary embodiment, respectively, of the present invention.

FIG. 4 is a flowchart illustrating a method of performing lawful interception according to a first exemplary embodiment of the present invention.

Referring to FIG. 4, the law enforcement server 110 requests lawful interception of an interception target to the lawful interception apparatus 126 of the service providing system 120 (S402). In this case, the law enforcement server 110 can transfer information of the trust server 140 to the lawful interception apparatus 126.

Further, the law enforcement server 110 commissions lawful interception authority of an interception target to the trust server 140 and transmits information about the interception target and the service providing system 120 that requests lawful interception to the trust server 140 (S404). The information about the interception target may include information of a terminal corresponding to the interception target and user information of a terminal corresponding to the interception target.

When the terminal 150 of the user connects to a service connection point of the service providing system 120 (S406), the lawful interception apparatus 126, having received a request for lawful interception from the law enforcement server 110 transmits information to use for an interception inquiry to the terminal 150 (S408). That is, the lawful interception apparatus 126 transmits information of the service connection point of the service providing system 120, its own information, user information, information of the terminal 150, and information of the trust server 140 to the terminal 150.

The terminal 150 stores information that is transmitted from the lawful interception apparatus 126 (S410).

Further, the lawful interception apparatus 126 inquires of the trust server 140 whether the connected terminal 150 is an interception target while transmitting information to use for an interception inquiry to the trust server 140 (S412).

The trust server 140 determines whether the connected terminal 150 is an interception target (S414), and the trust server 140 transmits result information to the lawful interception apparatus 126 (S416). In this case, when the information to use for an interception inquiry that receives from the lawful interception apparatus 126, the information that receives from the law enforcement server 110, i.e., information of the service providing system 120, and information about an interception target correspond, the trust server 140 determines that the terminal 150 is an interception target.

The lawful interception apparatus 126 receives result information from the trust server 140 and determines whether the terminal 150 is an interception target (S418).

If the terminal 150 is an interception target, the lawful interception apparatus 126 analyzes communication traffic that is related to the terminal 150 and transmits interception information to the law enforcement server 110 (S420-S422).

The terminal 150 may deviate from a service area of the service providing system 120 and connect to a network service connection point of the service providing system 130 of another network through handover or roaming.

When the terminal 150 connects to the network service connection point of the service providing system 130 of another network (S424), the terminal 150 transmits the stored information to use for an interception inquiry to the service providing system 130 (S426). That is, the terminal 150 transmits information of the service connection point of the service providing system 120, information of the service providing system 120, user information, information of the terminal 150, and information of the trust server 140 to the service providing system 130.

The lawful interception apparatus 136 of the service providing system 130 transmits information to use for an interception inquiry to the trust server 140 using the information of the trust server 140 and inquires whether the terminal 150 is an interception target (S428).

The trust server 140 determines whether the connected terminal 150 is an interception target (S430), and the trust server 140 transmits result information to the lawful interception apparatus 136 (S432).

The lawful interception apparatus 136 receives the result information from the trust server 140 and determines whether the terminal 150 is an interception target (S434).

If the terminal 150 is an interception target, the lawful interception apparatus 136 analyzes communication traffic that is related to the terminal 150 and transmits interception information to the law enforcement server 110 (S436-S438).

Figure 5:
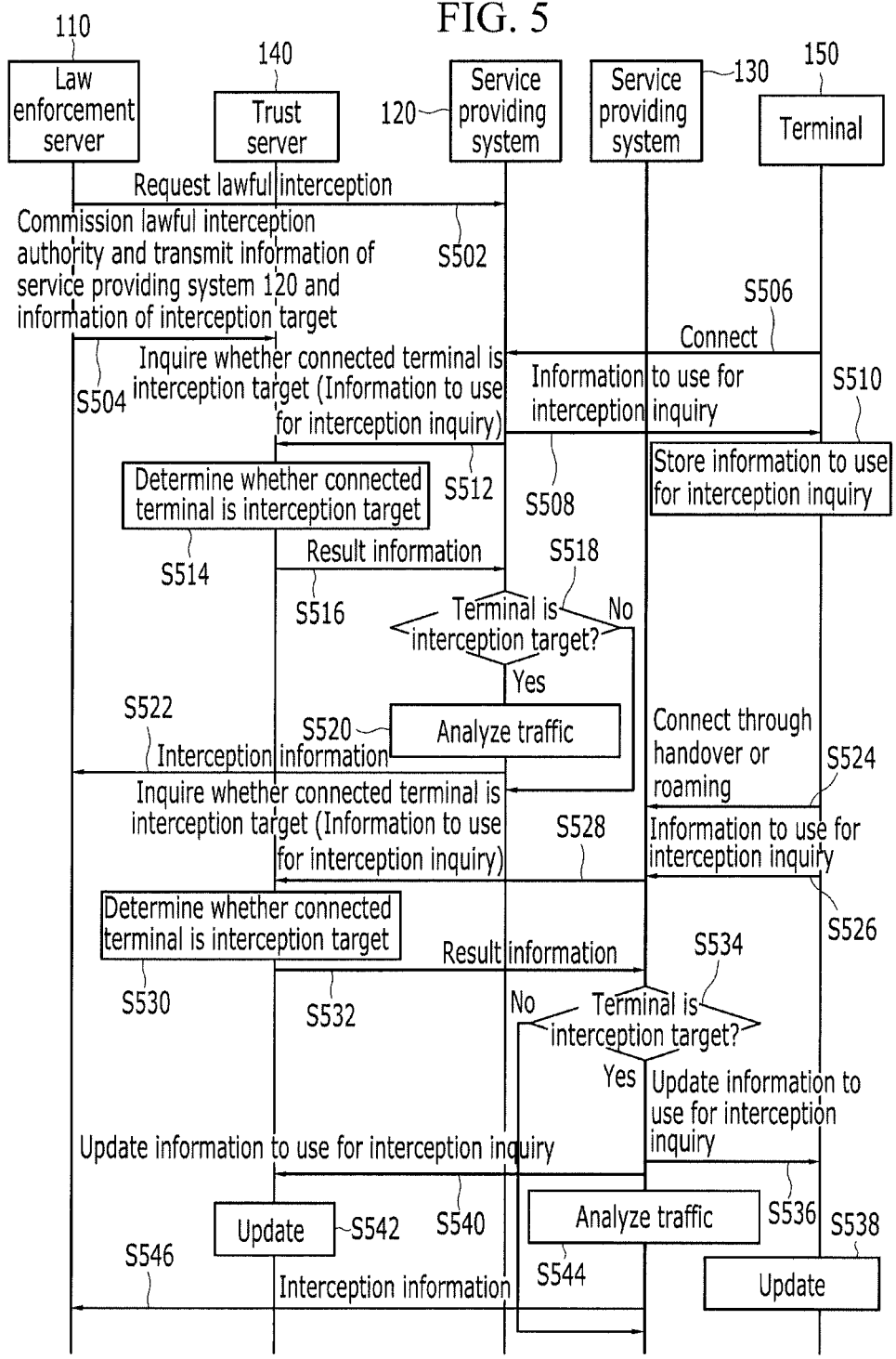

FIG. 5 is a flowchart illustrating a method of performing lawful interception according to a second exemplary embodiment of the present invention.

Referring to FIG. 5, the law enforcement server 110 requests lawful interception of an interception target to the lawful interception apparatus 126 of the service providing system 120 (S502).

Further, the law enforcement server 110 commissions lawful interception authority of an interception target to the trust server 140 and transmits information of the service providing system 120 that requests lawful interception and information about the interception target to the trust server 140 (S504).

When the terminal 150 of the user connects to a network service connection point of the service providing system 120 (S506), the lawful interception apparatus 126, having received a request for lawful interception from the law enforcement server 110 transmits information to use for an interception inquiry to the terminal 150 (S508).

The terminal 150 stores the information that is transmitted from the lawful interception apparatus 126 (S510).

Further, the lawful interception apparatus 126 inquires of the trust server 140 whether the connected terminal 150 is an interception target while transmitting information to use for an interception inquiry to the trust server 140 (S512).

The trust server 140 determines whether the connected terminal 150 is an interception target (S514), and the trust server 140 transmits result information to the lawful interception apparatus 126 (S516).

The lawful interception apparatus 126 receives the result information from the trust server 140 and determines whether the terminal 150 is an interception target (S518).

If the terminal 150 is an interception target, the lawful interception apparatus 126 analyzes communication traffic that is related to the terminal 150 and transmits interception information to the law enforcement server 110 (S520-S522).

When the terminal 150 deviates from a service area of the service providing system 120 and connects to a network service connection point of the service providing system 130 of another network (S524), the terminal 150 transmits the stored information to use for an interception inquiry to the service providing system 130 (S526).

The lawful interception apparatus 136 of the service providing system 130 transmits information to use for an interception inquiry to the trust server 140 using information of the trust server 140 and inquires whether the terminal 150 is an interception target (S528).

The trust server 140 determines whether the connected terminal 150 is an interception target (S530), and the trust server 140 transmits result information to the lawful interception apparatus 136 (S532).

The lawful interception apparatus 136 receives the result information from the trust server 140 and determines whether the terminal 150 is an interception target (S534).

If the terminal 150 is an interception target, the lawful interception apparatus 136 transmits update information to use for an interception inquiry to the terminal 150 (S536). In this case, the update information to use for an interception inquiry may include information of a service connection point of the service providing system 130 to which the terminal 150 connects, information of the service providing system 130, user information, information of the terminal 150, and information of the trust server 140.

Accordingly, the terminal 150 updates the stored information to use for an interception inquiry into update information to use for an interception inquiry that is transmitted from the lawful interception apparatus 136 and stores the update information (S538).

Further, if the terminal 150 is an interception target, the lawful interception apparatus 136 transmits update information to use for an interception inquiry to the trust server 140 (S540).

Accordingly, the trust server 140 updates the stored information to use for an interception inquiry into update information to use for an interception inquiry that is transmitted from the lawful interception apparatus 136 and stores the update information (S542). Accordingly, the trust server 140 determines an interception target using the update information to use for an interception inquiry.

If the terminal 150 is an interception target, the lawful interception apparatus 136 analyzes communication traffic that is related to the terminal 150 and transmits interception information to the law enforcement server 110 (S544-S546).

In this way, the service providing systems 120 and 130 of a network receive determination whether the connected terminal 150 is an interception target from the trust server 140 that receives commission of lawful interception authority of an interception target from the law enforcement server 110 and intercept the terminal 150 and thus even if the terminal 150 moves and connects to another network, a service providing system of a corresponding network can quickly perform interception of an interception target without previously receiving commission of interception authority of an interception target from the law enforcement server 110 and previously preparing an interception function of the interception target.

Exemplary embodiments of the present invention may be not only embodied through the above-described apparatus and/or method but also embodied through a program that executes a function corresponding to a configuration of the exemplary embodiments of the present invention or through a recording medium on which the program is recorded and can be easily embodied by a person of ordinary skill in the art from a description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A lawful interception apparatus of a first service providing system, comprising:
at least one controller device configured to execute:
an interception target determiner transmitting information to use for an interception inquiry to a trust server in which a law enforcement server commissions lawful interception authority, that inquires whether a terminal that connects to a service connection point of a first service providing system is an interception target;
an interceptor intercepting communication traffic that is related to the terminal when determined as the interception target; and
an information receiver receiving information to use for the interception inquiry from the terminal when the terminal connects to the service connection point of the first service providing system from a second service providing system that receives a request for lawful interception from the law enforcement server through handover,
wherein the terminal receives the information to use for the interception inquiry from the second service providing system when the terminal connects to the second service providing system.

2. The lawful interception apparatus of claim 1, further comprising an information transmitter transmitting the information to use for an interception inquiry to the terminal, when the first service providing system receives a request for lawful interception from the law enforcement server, if the terminal connects to the service connection point.

3. The lawful interception apparatus of claim 1, wherein the information to use for an interception inquiry comprises information of the second service providing system, and information of the trust server.

4. The lawful interception apparatus of claim 1, wherein the information to use for an interception inquiry further comprises information of a service connection point of the second service providing system.

5. The lawful interception apparatus of claim 1, further comprising an interception information providing unit that transmits interception information of the communication traffic to the law enforcement server.

6. A method of performing lawful interception of a terminal in a first service providing system of a first network, the method comprising:
   receiving, when the terminal connects to a service connection point of the first service providing system from a second service providing system that receives a request for lawful interception from the law enforcement server through handover, information to use for an interception inquiry from the terminal and information of a trust server in which a law enforcement server commissions lawful interception authority;
   inquiring of the trust server whether the terminal is an interception target and determining whether the terminal is the interception target; and
   intercepting communication traffic that is related to the terminal when determined as the interception target,
   wherein the terminal receives the information to use for the interception inquiry from the second service providing system when the terminal connects to the second service providing system.

7. The method of claim 6, wherein the determining of whether the terminal is an interception target comprises transmitting information to use for the interception inquiry to the trust server and inquiring whether the terminal is an interception target, and
   the trust server determines whether the terminal is the interception target using information to use for the interception inquiry.

8. The method of claim 7, wherein the information to use for the interception inquiry comprises information of the second service providing system and information of the terminal.

9. The method of claim 8, wherein the trust server receives information of the second service providing system and information of the interception target from the law enforcement server, and
   the trust server determines that the terminal is the interception target when the information that receives from the law enforcement server corresponds with the information to use for the interception inquiry.

10. The method of claim 6, further comprising:
    when the terminal is an interception target,
    transmitting information of the first service providing system and information of the terminal to the trust server; and
    transmitting the information of the first service providing system, the information of the terminal, and the information of the trust server to the terminal.

11. The method of claim 6, further comprising transmitting interception information of the communication traffic to the law enforcement server.

* * * * *